United States Patent [19]

Ferrentino

[11] 3,845,549

[45] Nov. 5, 1974

[54] APPARATUS AND PROCESS FOR THE CONTINUOUS MANUFACTURE OF A WAVEGUIDE FORMED BY A CYLINDRICAL HELIX

[75] Inventor: Antonio Ferrentino, Monza, Italy

[73] Assignee: Industrie Pirelli Societa per Azioni, Milan, Italy

[22] Filed: Feb. 20, 1973

[21] Appl. No.: 334,012

[30] Foreign Application Priority Data
Mar. 14, 1972 Italy.................................. 21796/72

[52] U.S. Cl........................... 29/600, 72/47, 72/136
[51] Int. Cl. ........................................... H01p 11/00
[58] Field of Search.... 29/600, 163.5 CW; 425/113, 425/150, 135, 145, 163; 333/95, 96, 97, 98; 72/47, 136; 57/9; 156/50, 51, 52, 53, 56, 180, 428, 429, 430, 431; 264/40, 117

[56] References Cited
UNITED STATES PATENTS

| | | | |
|---|---|---|---|
| 2,530,105 | 11/1950 | Wallace | 156/50 |
| 2,993,526 | 7/1961 | Young | 425/145 |
| 3,138,511 | 6/1964 | Cadwallader | 57/15 |
| 3,217,084 | 11/1965 | Feick | 156/56 |
| 3,336,175 | 8/1967 | Nutt et al. | 156/173 |
| 3,359,597 | 12/1967 | Bainton | 425/145 |
| 3,391,525 | 7/1968 | Ostermann | 57/9 |
| 3,769,697 | 11/1973 | Priaroggia et al. | 29/600 |

FOREIGN PATENTS OR APPLICATIONS

| | | | |
|---|---|---|---|
| 887,063 | 1/1962 | Great Britain | 333/98 R |
| 812,032 | 4/1959 | Great Britain | 333/95 A |

Primary Examiner—C. W. Lanham
Assistant Examiner—James R. Duzan
Attorney, Agent, or Firm—Brooks, Haidt & Haffner

[57] ABSTRACT

Apparatus and process for the continuous manufacture of a waveguide having a helically wound conductor with an exterior sheath extruded thereover in which a forming machine which can produce only a limited length of helix is stopped intermittently for the replacement of the conductor storage reels thereof but the extrusion press operates continuously. During the time that both the forming machine and the press are operating normally, they are maintained a substantially fixed distance apart, but during the time the forming machine is stopped, the extrusion press is moved toward the forming machine at a rate permitting uniform extrusion of the sheath on the previously formed helix. After the forming machine is restarted its forming speed is increased as the press is moved away therefrom until it reaches substantially its original spacing from the forming machine at which time the forming speed is returned to normal.

7 Claims, 3 Drawing Figures

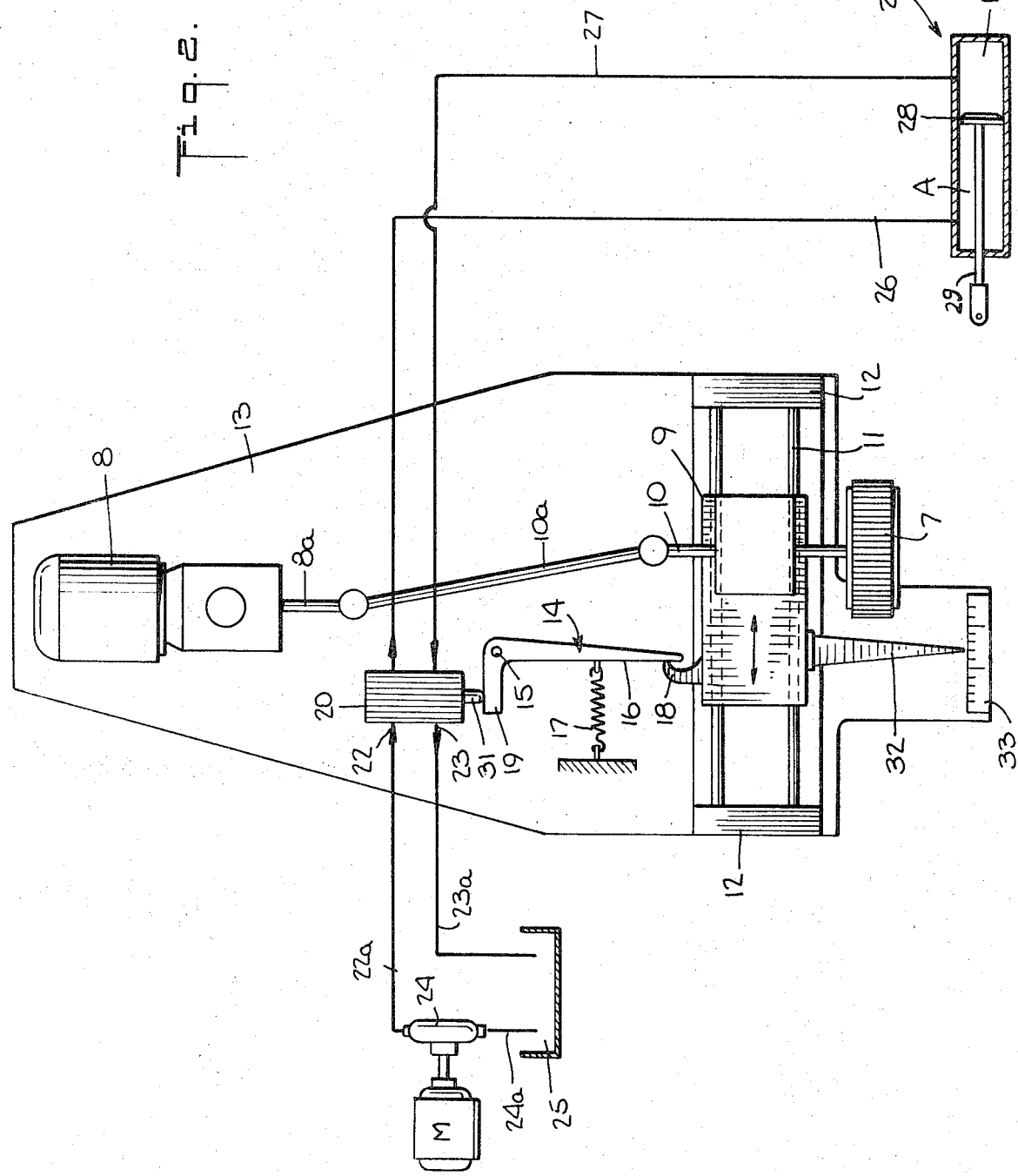

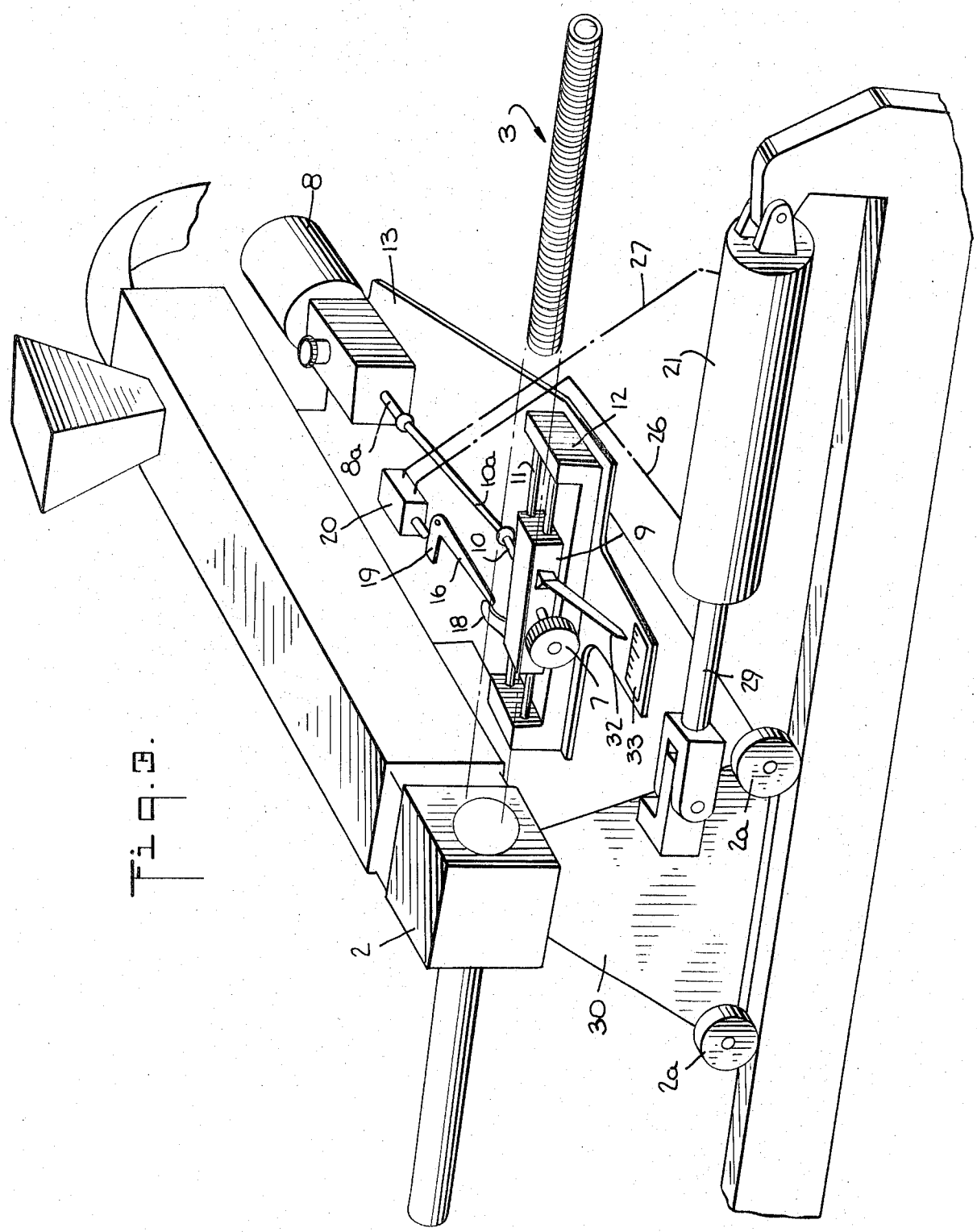

APPARATUS AND PROCESS FOR THE CONTINUOUS MANUFACTURE OF A WAVEGUIDE FORMED BY A CYLINDRICAL HELIX

This invention relates to the use of apparatus of the type described in my co-pending application Ser. No. 304,653 filed Nov. 8. 1972, now Pat. No. 3793864, and entitled "APPARATUS FOR MANUFACTURING A WAVEGUIDE FORMED BY A CYLINDRICAL HELIX."

The present invention relates to the manufacture of waveguides of the type containing a conductive element shaped as a cylindrical helix, the latter being covered with a layer of insulating plastic material.

In particular, the invention concerns an apparatus, the use of which involves both the forming machine for the production of cylindrical helices, and the extrusion presses which are to sheath the helix, wound up around a mandrel, with a layer of plastic material.

More specifically, the invention relates to an apparatus which permits the covering of a cylindrical helix with a layer of plastic material continuously extruded by the press even when the helix forming machine is at rest during some of its working steps and consequently, the cylindrical helix does not advance towards the press.

A forming machine suitable to be used for the purposes of the present invention may, for example, be the forming machine described in said co-pending application Ser. No. 304.653, which comprises a winding shaft provided with lateral plates supporting two reels, about which copper straps are wound. The rotation of the winding shaft about a mandrel causes the unwinding of the straps from storage reels and the formation of a two-start helix, as is described in detail in the specification of said application. At a certain distance from the forming machine and around the mandrel, there is an extrusion head of a conventional press, having the function of covering the cylindrical helix or helices with a layer of plastic material, circular in cross-section, which must be distributed regularly and without variations in its inner diameter in order to obtain a flexible sheath intended to keep the underlying turns in accurately aligned arrangement. Such alignment is necessary in view of the electrical characteristics which the waveguide must possess.

It will be apparent, therefore, that the extrusion operation has to be carried out at temperatures which are not suddenly varied as a result of possible stopping of the extrusion press. On the other hand, it is not possible to produce a waveguide of infinite length without stopping the helix forming machine to replace the reels, since such reels are unable to store straps or wires in an amount sufficient for more than a limited length of helix.

Unfortunately, during the replacement of the reels, besides the actual fitting of the new reel, it is necessary to weld the already wound up strap to the new one, and, as is known, this requires a cleaning of the parts to be joined and, therefore, a longer time than that required merely to replace the reels.

During said interruption, the forming machine must be necessarily stopped and, if the press is not working, owing to the time required to carry out all of the various steps needed, it will be apparent that the temperature of the extrusion head will vary, with the consequent risk of undesirable variations in the inner diameter of the sheath at the portion produced by the forming machine under changing temperature conditions.

The present invention has, as one object, the provision of an apparatus able to eliminate the abovementioned disadvantages.

Accordingly, one object of the invention is an apparatus for the manufacture of a waveguide, which comprises a first section including a forming machine rotating about a fixed mandrel for the formation of a cylindrical helix wound around said mandrel, and a second section including an extrusion press for covering said cylindrical helix, characterized in that, the apparatus also comprises means for causing relative movement, in the direction of the mandrel axis, of at least part of one section with respect to the other.

A further object of the invention is a process carried out by means of the apparatus forming an object of the invention, such process comprising a first phase, when the forming machine is not rotating and the extrusion press is operating, in which condition said machine and said press are at a certain distance with respect to each other, and then a second phase, when the forming machine is rotating and the extrusion press is operating. During the first phase, a relative movement between the forming machine and the press is caused which reduces the distance between the forming machine and the press, and during the second phase, the forming machine and the press are separated from each other by increasing the formation speed of the helix with respect to a predetermined, normal speed, said second phase terminating after a time corresponding to that taken by said parts to return to the same spacing which they had before the beginning of the first phase.

In one embodiment of the invention, means for causing said relative movement comprise a device intended to provide a constant speed which includes a small wheel, devices for indicating the difference between the relative speeds of the helix and the press and the constant speed which include a body supporting said small wheel, said body being movable on a support secured to the press, and devices for converting said difference of speed into a relative movement between the forming machine and the press which include a lever system fastened on the press, said lever system indicating by one arm thereof the position of the movable body with respect to the press and controlling at another arm thereof an actuation system for moving the press.

The objects and advantages of the invention will be better understood from the following description of the presently preferred embodiment thereof, which description should be considered in conjunction with the accompanying drawings, in which:

FIG. 2 is a diagrammatic plan view of the control apparatus which is associated with the forming machine and the press; and FIG. 3 is a fragmentary, diagrammatic, perspective view of the control apparatus shown in FIG. 2 associated with the extrusion press and the forming machine.

Figure 1:
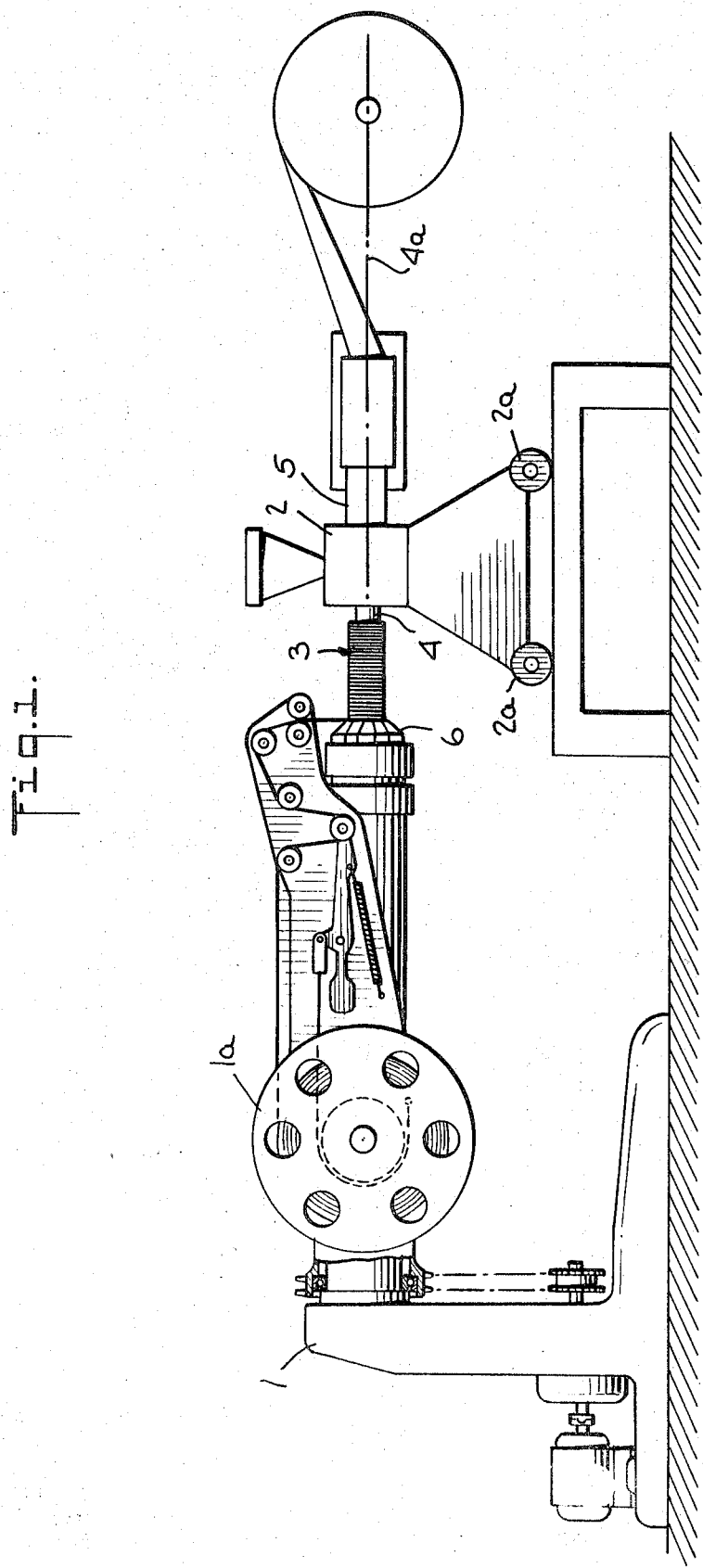
FIG. 1 is a diagrammatic, side elevation view, partly in section, of a forming machine and an extrusion press aligned in the direction of the axis of the forming machine mandrel.

The apparatus, described in detail hereinafter, has, as its main parts, a forming machine 1, an extrusion press 2, and control means for controlling the relative movement of the forming machine 1 and the press 2 with respect to each other.

In the illustrated example, the forming machine 1 is of the same type as that described in said application Ser. No. 304,653. As described in said application, the formation of a helix 3 (FIG. 1) is carried out by rotation of a portion of the forming machine about a fixed mandrel 4. The formation of a sheath 5 is carried out by covering the helix 3 as it is pushed along the mandrel 4 by an advancing system 6 in the direction from the forming machine 1 towards the extrusion head of an extrusion press 2, which is of the conventional type but is movable in a direction parallel to the axis 4a of the mandrel 4, the press 2 being mounted on wheels 2a. The strap to be wound into a helix is carried on reels, one of which is designated by the reference 1a.

As mentioned hereinbefore, to prevent cooling of the press, which consequent undesirable effects on the sheath 5 due to variations of the inner diameter of the latter, it is necessary to continuously extrude the sheath 5 on the helix 3 even when the straps intended to form the latter are being replaced and welded.

Therefore, according to the present invention, means are provided which permit movement of the forming machine 1 or the press 2 with respect to each other in the direction of the mandrel axis 4a. In the embodiment shown, the press 2 is moved toward and away from the forming machine 1.

The means for producing said relative movement comprises a device for providing a constant speed, devices responsive to a difference of speed between the speeds of the helix 3 and the press 2 and said constant speed, and devices for converting said difference into the relative movement.

The device for providing the constant speed comprises a small wheel 7 (see FIGS. 2 and 3) which bears continuously on the helix 3, namely, both when the latter advances along the mandrel 4 and when it is stationary. Moreover, the wheel 7 is rotated by a motor 8 which rotates its output shaft 8a at a number or revolutions per minute which can be programmed at a pre-established value, such that the peripheral speed of the wheel 7 is equal to the speed it is wished to obtain for the advancement of the helix 3 along the mandrel 4 in the direction from the forming machine 1 towards the extrusion head of the press 2.

The devices for indicating the difference between the speeds of the helix 3 and the press 2 and said constant speed comprise a body 9 supporting the shaft 10 of the wheel 7 (see FIG. 2) and slidable on the guides 11 of supports 12, the supports 12 being secured to a plate 13 integral with the press 2.

The devices for converting the differences of speed into a relative movement between the forming machine 1 and the press 2 comprise a lever system 14, having a fulcrum 15 on the plate 13 integral with the press 2, and an arm 16 subjected to the action both of a spring 17, one end of which is secured to the plate 13, and of a tooth 18 extending from the body 9. The other arm 19 acts on an actuation system for the movement of the press 2, as explained hereinafter.

The arm 16 of the lever system 14 is moved in accordance with the position of the movable body 9 with respect to the press 2 and controls by its arm 19 the actuation system for moving the press 2. Specifically, when the tooth 18, owing to a displacement of the body 9 with respect to the press 2 to the right as viewed in FIG. 2, slides on the guides 11, the tooth 18 applies a force to the arm 16 which overcomes the action of the spring 17, with a consequent rotation of the lever system 14 about its fulcrum 15 and a displacement of the arm 19 from its position shown in FIG. 2.

It is clear that, if the displacement of the movable body 9 with respect to the press 2 is made dependent of the difference of speed between the relative speeds of the helix 3 and the press 2 and the constant speed of the small wheel 7 and if the movement of the arm 19 of the lever system 14 is caused to act on the actuation system, it is possible to control the movement of the press 2 as a function of the displacement of the helix 3 with repsect to the press 2.

To obtain such control, the wheel 7 is placed into contact with the helix 3 and has such a sense of rotation that, when the helix 3, under normal conditions of production, advances towards the mandrel 4, the axis of said wheel 7 remains stationary and there is no displacement of the movable body 9 on the guides 11, whereas, when the forming machine 1 stops and the helix 3 no longer advances towards the press 2, the relative speed between the helix 3 and the press 2 being zero, the body 9 is displaced on the guides 11 as a result of the rolling of the small wheel 7 on the idle helix 3.

This rolling of the wheel 7 can take place because the connection 10a between the output shaft 8a of the motor 8, the latter being fixed on the plate 13, and the shaft 10 of the small wheel 7 is of the flexible type.

The action exerted by the tooth 18 during the displacement of the body 9 is indicated by the lever system 14 which, in turn, controls with the arm 19 the actuation system which causes movement of the press 2 towards the forming machine 1 to permit the continuous extrusion of plastic material on the helix 3 to form the sheath 5. It is evident that the actuation system can be of any conventional mechanical, hydraulic or electrical type, and by of example, the embodiment illustrated comprises a hydraulic pilot valve 20 and a double-acting cylinder 21.

The pilot valve 20, through an inlet 22 and an outlet 23, is connected by a pipe 22a to a pump/motor unit 24 (FIG. 2) and by another pipe 23a to a reservoir 25 into which the suction pipe 24a of the pump/motor unit 24 extends. Two further pipes 26 and 27 connect the two portions A and B of cylinder 21, separated by a piston 28, to the pilot valve 20, and the piston 28, through a rod 29, is connected to the movable base 30 supporting the press 2 (FIG. 3).

The actuation system comprises a feeler 31 in contact with the arm 19 of the lever system 14 so that when the helix 3 is being formed at its normal rate, the axis of the wheel 7 and the lever system are stationary, and said feeler 31 maintains the pressures of the fluid at the right and at the left of the piston 28 in balance. On the other hand, depending on the movement of the body 9, the feeler 31 is subjected to movement by the arm 19 as a result of the rotation of the lever system 14 about the fulcrum 15. Such movement of the feeler 31 causes a higher fluid pressure on one or the other faces of the piston depending on the direction of movement of the feeler 31, which causes displacement of the base 30, and therefore, of the press 2.

Specifically, the actuation system is operated in such a way that, when there is a displacement of the body 9 on the guides 11, in the direction from the press 2 towards the forming machine 1, the lever system 14 turns anticlockwise about the fulcrum 15. The feeler 31 is thereby permitted to move, under spring pressure, outwardly of the valve 20 which causes the flowing of fluid at a higher pressure into the chamber A of the cylinder 21, with a consequent displacement of the base 30, and therefore, of the press 2, towards the forming machine 1.

In order to indicate the amount of the displacement of the movable body 9 with repsect to the press 2, said movable body 9 is provided with a pointer 32, and the plate 13 secured to the press 2, is provided with a graduated scale 33.

The various phases corresponding to the operations relating to the replacement of the reels will be described hereinafter with reference to the apparatus hereinbefore described.

As stated, under normal conditions, the difference of speed between the relative speeds of the helix 3 and the press 2 and the constant speed of the small wheel 7 is zero, since the press 2 is in a fixed position and the helix 3 moves forward along the mandrel 4 in the direction from the forming machine 1 towards the extrusion head of the press 2 at a speed which is assumed as the pre-established one, and which is, therefore, equal to the constant peripheral speed of the small wheel 7. Under such conditions, as explained hereinbefore, the actuation system does not move the base 30 supporting the press 2 because the feeler 31 maintains the valve 20 in a state which maintains equal fluid pressure on opposite faces of the piston 28. When the reels, e.g. reel 1a, are to be replaced, the forming machine 1 is stopped. In this condition, the forming machine 1 and the press 2 are initially aligned in the direction of the mandrel axis 4a at a predetermined distance with respect to each other. In said first phase, with the press 2 still operating to extrude material of the sheath 5, the press 2 is moved toward the forming machine 1.

The distance between the press 2 and the forming machine 1 at the beginning of the first phase is selected so as to have a length of the helix 3 stored on the mandrel which is sufficient to allow the operating press 2 to continue to extrude the sheath 5 during the entire duration of the first phase necessary for replacing the reels.

It will be evident that in order to permit continuous extrusion of the sheath 5 on the helix 3 during the next time of replacement of the reels, it is necessary for the press 2 to move away from the forming machine 1 at the end of the first phase and to return to the position it had prior to the first phase. Thus, during the second phase, the press 2 moves away from the forming machine 1 at a predetermined rate as described hereinafter.

At the beginning of the first phase, the stopping of the forming machine 1 modifies the difference of speed between the relative speeds of the helix 3 and the press 2 and the constant speed of the small wheel 7, since the helix 3 and the press 2 are stationary, whereas the small wheel 7 continues to rotate at a constant peripheral speed. Since the helix 3 is stationary, the wheel 7 rolls on it towards the forming machine 1, thereby displacing the body 9 on the guides 11.

The arm 16 of the lever system 14 is, therefore, subjected to the force of the tooth 18, and, acting against the action of the spring 17, moves around the fulcrum 15 compelling the arm 19 to take a new position and to modify, through the actuation system, the balance of the pressures inside the cylinder 21. Under these conditions, the piston 28 pulls the base 30, together with the press 2, towards the forming machine 1. Movement of the base 30, and hence the plate 13, causes displacement of the fulcrum 15 of the lever system 14, in such a way as to oppose the action initially exerted by the tooth 18 on the arm 16 of said lever system 14.

The tooth 18 and the fulcrum 15 (and therefore, the press 2) move at the same time towards the forming machine 1, as would be the case if a rigid connection were provided between the press 2 and the movable body 9 and if the small wheel 7 had theoretically a torque sufficient to cause said displacement.

When the strap welding and reel replacement operations are completed, the second phase commences. In said second phase, the forming machine 1 is rotating and the press 2 is operating, and during such second phase, the forming machine 1 and the press 2 are moved apart until they are spaced by the pre-existing distance. However, by increasing the helix formation speed with respect to the normal speed, which corresponds to the constant speed of the small wheel 7, the helix 3 is formed at a rate which corresponds to the rate of extrusion plus the rate at which the forming machine 1 and the press 2 are moved apart so that the sheath 5 is deposited uniformly on the helix 3.

At the beginning of the second phase the speed at which the small wheel 7 approaches the forming machine 1 is lower because of the advancement of the helix 3, whereas the press 2 not having received immediately a contrary control, tends to advance towards the forming machine 1 at the speed it had initially. The lever system 14, which is not subjected at its arm 16 to the action of the tooth 18, as it was during the first phase, tends to exert on the feeler 31 of the valve 20 such an action as to reduce the pressure in chamber A of the cylinder 21, thus slowing down the base 30, and therefore, the press 2 until there is a new position of contact between the tooth 18 and the arm 16 of the lever system 14. As the speed of the forming machine 1 is progressively increased, the base 30 is slowed down and, when the speed of the helix 3 along the mandrel 4 exceeds the peripheral speed of the small wheel 7, retarding action is exerted on the body 9 along the guides 11 in the direction from the forming machine 1 towards the original position of the press 2. At this point the action of the spring 17, overcoming the action of the tooth 18, causes a clockwise rotation of the lever system 14 about the fulcrum 15, which results in movement of the feeler 31 of the valve 20 by the arm 19, which action is opposite to that of the first phase. At this time, the pressure in chamber B of cylinder 21 prevails over that in chamber A, so that the base 30, and therefore, the press 2, are moved towards the position of normal operation.

The latter movement is stopped after a time sufficient to bring the press 2 again to a distance, with respect to the forming machine, which is equal to that existing before the beginning of the first phase. In this way, the apparatus is again ready to carry out continuous extrusion as described during the subsequent replacement of the reel.

When the press 2 reaches the distance it had under normal conditions with respect to the forming machine 1, the operator again brings the helix formation speed to a value corresponding to that of said normal conditions, so that the movement of the press 2 is stopped.

A considerable advantage of the apparatus of the invention is that it is possible to use it without substantial modifications of the already known apparatus for the formation of waveguides. Another advantage of the apparatus of the invention is that it permits the carrying out of a process in which the presence of the operator is merely required to increase progressively the speed of production of the forming machine 1 until the press 2 is returned to its original distance relative to the forming machine, and this can be effected by the same operator who is in charge of the replacement of the reels. A further advantage of the apparatus of the invention is that it permits the elimination of the idle times due to the replacement of the reels.

Although a preferred embodiment of the present invention has been described and illustrated, it will be understood by those skilled in the art that various modifications may be made without departing from the principles of the invention. For example, instead of moving the press 2 toward and away from the forming machine 1, the press 2 may remain stationary and the forming machine 1 may be moved toward and away from the press 2. Also, if desired, although not preferred, both the press 2 and the machine 1 could be movable to obtain the desired relative displacements.

What is claimed is:

1. Apparatus for the manufacture of a waveguide comprising a conductor wound in the form of a helix and a sheath of extruded material thereover, said apparatus comprising a mandrel, forming means for forming said conductor into a helix around said mandrel, means for advancing said helix in the direction of its axis and away from said forming means as the helix is formed, extrusion means for extruding said material over said helix, said extrusion means being spaced from said forming means and being disposed to receive said helix as it is advanced and to extrude said material thereover, and moving means connected to one of said forming and extrusion means for moving said one means toward the other of said forming and extrusion means at a predetermined rate dependent upon the rate of relative movement between said helix and said extrusion means, said moving means comprising power operated means connected to said one means for displacing the latter in the direction of said axis and control means connected to said power operated means for controlling the displacement of said one means, said control means comprising constant speed means, relative movement means responsive to the speed of advance of said helix relative to said extrusion means, comparison means connected to said constant speed means and said relative movement means and responsive to the difference between the speed of said constant speed means and the speed of relative movement between said helix and said extrusion means, and actuation means connected to said comparison means and to said power operated means for controlling the operation of the latter.

2. Apparatus as set forth in claim 1, wherein said forming means is stationary and said moving means is connected to said extrusion means for moving the latter toward and away from said forming means.

3. Apparatus as set forth in claim 1, wherein said constant speed means comprises a wheel engageable at the periphery thereof with said helix and motor means for driving said wheel at a constant speed, said relative movement means comprises a body slidably mounted on said extrusion means and supporting said wheel, said comparison means comprises lever means carried by said extrusion means and in engagement with and movable by said body in accordance with the relative positions of said body and said extrusion means.

4. Apparatus as set forth in claim 3, wherein said power operated means comprises a fluid operable piston and cylinder means and said actuation means comprises a valve connected to control the supply of fluid to said piston and cylinder means and connected to and controlled by said lever means.

5. Apparatus as set forth in claim 5, wherein said forming means is mounted in a fixed position and said extrusion means is mounted for movement toward and away from said forming means along a path substantially parallel to the axis of said helix and wherein said piston and cylinder means is connected to said extrusion means and acting between the latter and a fixed point for moving said extrusion means along said path and toward and away from said forming means, wherein said valve controls the position of said piston relative to said cylinder, said valve having a feeler for controlling said valve and hence, the position of said piston relative to said cylinder, and wherein said lever is pivotally mounted on said extrusion means and connected to said feeler and to said body for controlling the position of said feeler in accordance with the position of said body.

6. A process for the continuous manufacture of a helical waveguide having a conductor wound in the form of a helix covered by a sheath of extruded material, said process comprising intermittently forming finite lengths of said helix at a first position, the formation of said helix being interrupted at the completion of the formation of a finite length; advancing said lengths as they are formed in the direction of their axis and toward continuously operating extrusion apparatus spaced a predetermined distance from said first position, at least a portion of each length being formed and advanced at a predetermined normal rate; extruding material of said sheath over said helix with said extrusion apparatus while moving said helix and said extrusion apparatus relative to each other at a predetermined rate; maintaining substantially said predetermined rate of relative movement of said helix and said extrusion apparatus during interruptions in the formation of said helix by decreasing the spacing between said first position and said extrusion apparatus; after an interruption in the formation of said helix, increasing the rate of formation and advance of said helix above said predetermined normal rate while maintaining substantially said predetermined rate of relative movement of said helix and said extrusion apparatus by increasing the spacing between said first position and said extrusion apparatus until they are again spaced by substantially said predetermined distance; and as said spacing reaches said predetermined distance, decreasing said rate of formation and advance of said helix to substantially said predetermined normal rate.

7. A process as set forth in claim 6 wherein said extrusion apparatus is moved toward said first position during said interruptions and is moved away from said first position during the increase in formation and advance of said helix above said predetermined normal rate.

* * * * *

UNITED STATES PATENT OFFICE
CERTIFICATE OF CORRECTION

Patent No. 3,845,549          Dated November 5, 1974

Inventor(s) ANTONIO FERRENTINO

It is certified that error appears in the above-identified patent and that said Letters Patent are hereby corrected as shown below:

Col. 3, line 19    "which" should read --with-- line 41    "or" should read --of--

Col. 8, line 14    "5" (second occurrence) should read --4--

Signed and sealed this 24th day of December 1974.

(SEAL)
Attest:

McCOY M. GIBSON JR.  
Attesting Officer

C. MARSHALL DANN  
Commissioner of Patents